US012666318B2

(12) United States Patent
Stanczak et al.

(10) Patent No.: US 12,666,318 B2
(45) Date of Patent: Jun. 23, 2026

(54) CONDITIONAL CELL RELEASING

(71) Applicant: Nokia Technologies Oy, Espoo (FI)

(72) Inventors: Jedrzej Stanczak, Wroclaw (PL);
Srinivasan Selvaganapathy, Bangalore
(IN); Krzysztof Kordybach, Wroclaw
(PL); Tero Henttonen, Espoo (FI)

(73) Assignee: Nokia Technologies Oy, Espoo (FI)

( * ) Notice: Subject to any disclaimer, the term of this
patent is extended or adjusted under 35
U.S.C. 154(b) by 483 days.

(21) Appl. No.: 18/040,012

(22) PCT Filed: Jun. 9, 2021

(86) PCT No.: PCT/EP2021/065471
§ 371 (c)(1),
(2) Date: Jan. 31, 2023

(87) PCT Pub. No.: WO2022/028756
PCT Pub. Date: Feb. 10, 2022

(65) Prior Publication Data
US 2023/0284105 A1 Sep. 7, 2023

(30) Foreign Application Priority Data
Aug. 7, 2020 (IN) .............................. 202011033899

(51) Int. Cl.
*H04W 36/00* (2009.01)
(52) U.S. Cl.
CPC ... *H04W 36/0064* (2023.05); *H04W 36/0069*
(2018.08)

(58) Field of Classification Search
None
See application file for complete search history.

(56) References Cited

U.S. PATENT DOCUMENTS

| | | | | |
|---|---|---|---|---|
| 2005/0192010 A1* | 9/2005 | Kirla | ..................... | H04W 36/02 455/438 |
| 2018/0213450 A1 | 7/2018 | Futaki et al. | | |
| 2018/0324651 A1 | 11/2018 | Tenny et al. | | |
| 2019/0191345 A1* | 6/2019 | Yamada | .......... | H04W 36/00725 |
| 2019/0305918 A1 | 10/2019 | Siomina et al. | | |
| 2020/0022032 A1 | 1/2020 | Tenny et al. | | |

(Continued)

FOREIGN PATENT DOCUMENTS

| | | |
|---|---|---|
| WO | 2019/233283 A1 | 12/2019 |
| WO | 2020/088777 A1 | 5/2020 |

OTHER PUBLICATIONS

"3rd Generation Partnership Project; Technical Specification Group
Radio Access Network; Evolved Universal Terrestrial Radio Access
(E-UTRA) and NR; Multi-connectivity; Stage 2 (Release 16)",
3GPP TS 37.340, V16.1.0, Mar. 2020, pp. 1-74.

(Continued)

*Primary Examiner* — Abdelillah Elmejjarmi
(74) *Attorney, Agent, or Firm* — Lippes Mathias LLP

(57) ABSTRACT
Inter-alia, a method is disclosed comprising: determining
conditional cell release information indicative of at least one
condition based on which a configured cell of a cell group
of a mobile communication network is to be released; and
releasing the configured cell based, at least in part, on the
conditional cell release information. It is further disclosed an
according apparatus, computer program and system.

12 Claims, 9 Drawing Sheets

(56) References Cited

U.S. PATENT DOCUMENTS

| | | | |
|---|---|---|---|
| 2020/0196205 A1 | 6/2020 | Kim | |
| 2021/0014753 A1* | 1/2021 | Ma | H04W 36/08 |
| 2023/0117911 A1* | 4/2023 | Wang | H04W 36/362 |
| | | | 370/331 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"Addition of NR RRRC TC-PSCell addition, modification and release / Split DRB / EN-DC", 3GPP TSG5 Ran meeting #79, R5-182893, Qualcomm Incorporated, May 21-25, 2018, 9 pages.

International Search Report and Written Opinion received for corresponding Patent Cooperation Treaty Application No. PCT/EP2021/065471, dated Oct. 7, 2021, 13 pages.

"On the scope of Rel-17 CPAC", 3GPP TSG-RAN WG2 Meeting #111-e, R2-2007364, Agenda item: 8.2.3, Nokia, Aug. 17-28, 2020, 7 pages.

* cited by examiner

300

301 — Requesting or obtaining a request for a conditional cell release procedure 302 — Providing reconfiguration information 303 — Remapping or releasing one or more bearers 304 — Obtaining an indication of an execution of the cell release of the configured cell 305 — Obtaining forwarded data 400a

CONDITIONAL CELL RELEASING

RELATED APPLICATION

This application was originally filed as PCT Application No. PCT/EP2021/065471, filed on Jun. 9, 2021, which claims priority from IN application No. 202011033899, filed on Aug. 7, 2020, each of which is incorporated herein by reference in its entirety.

FIELD

The following disclosure relates to the field of mobile communication networks, or more particularly relates to systems, apparatuses, and methods for conditional cell release procedure of a mobile device.

BACKGROUND

Standardization 3GPP Rel-16 defines a conditional PSCell Change (CPC) procedure, wherein a PSCell is changed when the configured condition is met. A very small subset of cases originally discussed has eventually been covered (i.e. only intra-SN (Secondary Node) PSCell change). CPC may be applied in other deployments, as well as the CPA (Conditional PSCell Addition, i.e. MR-DC establishment based on a previously configured condition). Further, PSCell Addition and PSCell Change exist in the standard, similarly to a PSCell Release.

Such a PSCell Release procedure requires several steps to be taken (e.g. between a MN (Master Node) and a SN of the mobile communication network) before the actual release of the cell can happen at the mobile device (e.g. a UE (User Equipment)).

When the cell respectively the SN is released, it requires several steps to be taken and messages to be exchanged. The mobile communication network does not have instantaneous measurement results if a respective SN becomes weak. Those are available at the UE and possibly reported to the mobile communication network (which then takes several actions, which are time-consuming and can lead to failure). Thus, it is better if the UE takes immediate actions once e.g. the measurement results are available and the network has previously allowed the UE to take such steps if the condition is met.

In addition, the mobile communication network also does not have the instant and full knowledge on the UE's needs in terms of UL transmissions. BSR (Buffer Status Reporting) is naturally an option, but it also takes time and requires cross-layer interaction, if e.g. a PSCell would have to be released based on the BSR.

SUMMARY OF SOME EXEMPLARY EMBODIMENTS

In case the release or PSCell change is not completed in time, the S-RLF (Secondary-Radio Link Failure) will be declared and, as a result, the PSCell will be released. This does not break the connection entirely (as MN is still there), but will cause data interruption for any SN-terminated bearer, or an MN-terminated bearer with only SCG (Secondary Cell Group) radio resources allocated (when PSCell is released and MN takes over all bearer handling). This may not be acceptable for URLLC (Ultra Reliable and Low Latency Communications) services in e.g. 5G or 5G+ communication networks.

It is thus, inter alia, an object of embodiments disclosed to enable change or releasing of a configured cell without the need to have high latency signaling being required.

According to a first exemplary aspect, a method is disclosed, the method comprising:

determining conditional cell release information indicative of at least one condition based on which a configured cell of a cell group of a mobile communication network is to be released; and releasing the configured cell based, at least in part, on the conditional cell release information.

This method may for instance be performed and/or controlled by an apparatus, for instance a mobile device, e.g. a mobile terminal, UE, smartphone, tablet, IoT-device, wearable, or a combination thereof, to name but a few non-limiting examples. For instance, the method may be performed and/or controlled by using at least one processor of the mobile device. The mobile device may be an entity of the mobile communication network. The mobile device may be capable of multicarrier operation in the mobile communication network.

According to a further exemplary aspect, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a second exemplary aspect, a method is disclosed, the method comprising:

requesting or obtaining a request for a conditional cell release procedure of a configured cell of a cell group of a mobile communication network; and obtaining forwarded data upon obtaining of an indication of a releasing of the configured cell.

This method may for instance be performed and/or controlled by an apparatus, for instance a radio access node, e.g. a master node, e.g. an en-gNB or a ng-eNB. Alternatively, this method may be performed and/or controlled by more than one apparatus, for instance a master node and a secondary node (e.g. an eNB, or a ng-eNB) of the mobile communication network. For instance, the method may be performed and/or controlled by using at least one processor of the radio access node.

According to a further exemplary aspect, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising: at least one apparatus according to the first exemplary aspect as disclosed above, and at least one apparatus according to the second exemplary aspect as disclosed above.

In the following, exemplary features and exemplary embodiments will be described in further detail.

A mobile communication network, as used herein, refers to a network that can be utilized by one or more mobile devices. Such a mobile communication network typically operates in accordance with a given standard or specification which may set out what the various entities (e.g. the one or more mobile devices, one or more base stations respectively radio access nodes (e.g. gNBs (NodeB)) associated with the mobile communication network are permitted to do and how that should be achieved. Communication protocols and/or parameters which shall be used for the connection are also typically defined. Examples of standardized radio access technologies comprise GSM (Global System for Mobile), EDGE (Enhanced Data for GSM Evolution), Radio Access Networks (GERAN), Universal Terrestrial Radio Access Networks (UTRAN) and evolved UTRAN (E-UTRAN), to name but a few non-limiting examples. An example of standardized communication system architecture is Long-term Evolution (LTE) of the Universal Mobile Telecommunications Systems (UMTS) Radio Access Technology. LTE is standardized by the 3rd Generation Partnership Project (3GPP). The LTE employs E-UTRAN access. Further developments are referred to as LTE Advanced (LTE-A), fifth generation (5G), or 5G+, and/or New Radio (NR) communication standard.

A respective mobile device may be configured for multicarrier operation, e.g. so-called dual connectivity (DC) or multi-connectivity (MC) in the mobile communication network (e.g. NR mobile communication network). The mobile device may be configured with a MCG (Master Cell Group) via a MN (master radio access node) and a SCG (Secondary Cell Group) via a SN (secondary radio access node) of the mobile communication network. Such a CG (Cell Group), as used herein, refers to a group of cells serving the mobile device (e.g. the apparatus according to the first exemplary aspect). Thus, the group of cells may be associated with the MN such as a master gNB in case of the MCG. The group of cells may be associated with a SN such as a secondary gNB in case of SCG. MCG may be a cell group enabling serving of one or more mobile devices that are associated with the MN, e.g. comprising a so-called PCell (Primary Cell) and optionally one or more SCells (Secondary Cells). SCG may be a cell group enabling serving of the one or more mobile devices that are associated with the SN, e.g. comprising a so-called PSCell (Primary Cell of the SCG; Primary SCell) and optionally one or more SCells of the SCG.

A PSCell setup or PSCell release procedure herein refers to a respective procedure which enables the mobile communication network (e.g. via the MN to the respective mobile device) to at least temporarily setup, thus configure, and then release, thus, de-configure) the use of the respective PSCell, in downlink and/or in uplink by the respective mobile device.

PSCell addition will be understood as a configuration of one or more PSCell(s) the respective mobile device can use. PSCell release will be understood as a de-configuration of one or more configured PSCell(s) that the respective mobile device is configured with to use. PSCell change will be understood as a change from (a) configured PSCell(s) to one or more other PSCells so that the respective mobile device is configured with the one or more other PSCells. Then, the one or more other PSCells may serve the respective mobile device, e.g. by providing one or more services (e.g. transmission of uplink and/or downlink data, to name but a few non-limiting examples) to the respective mobile device.

The configuration procedure of PSCell(s) may be used in DC or multi-connectivity (MC) of the mobile communication network by the serving radio access node, e.g. the MN, to configure the respective mobile device with, or add or setup, the PSCell of the SCG. The de-configuration procedure of PSCell(s), e.g. PSCell release procedure may be used to de-configure or release or remove already configured PSCell(s) serving the respective mobile device. The configuration and de-configuration may be performed and/or controlled RRC (Radio Resource Control) signaling, e.g. RRC messages.

For instance, the provision of URLLC services in case the mobile communication network is a 5G or 5G+ or NR communication network may benefit of one or more activated PSCells (thus, configuration of the respective PSCell(s) via RRC takes places). In case a respective active PSCell is not reliable, the provision of the respective URLLC service may benefit from releasing (thus, deactivating or de-configuration) of the respective PSCell on the corresponding configured secondary carriers of the SCG. The PCell of the MCG may always be activated to ensure provision of service to the respective mobile device.

Such an apparatus (e.g. a mobile device) according to the first exemplary aspect, as used herein, may for instance be portable (e.g. weigh less than 1, 0.8, 0.6, 0.4, 0.2, 0.1 kg, or less), like a mobile phone, personal digital assistance device, computer, laptop computer, a UE, or a combination thereof as non-limiting examples. The apparatus may for instance comprise or be connectable to a display for displaying information. The apparatus may for instance comprise or be connectable to means for outputting sound, e.g. in the form of spoken commands or information. The apparatus may for instance comprise or be connectable to one or more sensors for determining the devices position, such as for instance a GNSS receiver, in the form of a GPS receiver. The apparatus may for instance comprise or be connectable to one or more sensors, e.g. in the form of an accelerometer and/or a gyroscope and/or magnetometer and/or barometer for gathering (e.g. measuring) further information, such as motion sensor data. The apparatus may for instance comprise or be connectable to a receiver and/or a transmitter (e.g. a transceiver) for receiving and/or sending information.

The determining of the conditional cell release information may be performed and/or controlled so that the apparatus can evaluate whether or not the CPR (Conditional PSCell Release) execution condition is present. This may allow the apparatus to release a configured cell (e.g. PSCell) based on whether or not the at least one condition is met. This will be understood herein as CPR. In case the CPR execution condition is present, the apparatus performs (e.g. executes) the release of the configured cell, e.g. the PSCell release. This may for instance be releasing (e.g. de-configuring) a link to the cell of the cell group (e.g. PSCell of the SCG). This may allow the apparatus (e.g. a respective mobile device, e.g. a UE) to release its PSCell when the at least one condition is present (e.g. met). The apparatus may release the cell of the cell group (e.g. the respectively its PSCell of the SCG) without further signaling needed to take place between the apparatus and the mobile communication network (e.g. a MN of the mobile communication network).

The at least one condition may be a condition to be met prior to a performing and/or controlling (e.g. execution) of the (step of) releasing of the configured cell by the apparatus. The configured cell may be added (e.g. configured) prior via a RRC Reconfiguration message that is obtained (e.g. received) e.g. from a MN of the mobile communication network (e.g. the apparatus according to the second exemplary aspect). The MN of the mobile communication network may configure a respective PSCell of a SCG by providing (e.g. sending) a SN Addition Request to a respective SN of the mobile communication network (e.g. a respective SN of a SCG of the mobile communication network). The respective SN may confirm this request, e.g. by responding (e.g. providing or sending) a SN Addition Request Acknowledge message to the MN. Based on the acknowledgement the MN may have obtained (e.g. received) from the respective SN, the MN may provide the RRC configuration to perform and/or control PSCell addition of the SCG to the apparatus. For instance, then, a link between the apparatus and the SN may be established enabling the SN of the cell group (e.g. SCG) to serve the apparatus accordingly, thus PSCell addition takes place. The configured cell may be understood to be represented by the above disclosed PSCell.

For releasing the configured cell (e.g. PSCell) of the cell group of the mobile communication network, the configured cell may be de-configured. For instance, the configured cell (e.g. PSCell) may be released, by releasing (e.g. de-configuring) an established link between the apparatus and the SN providing the configured cell (e.g. PSCell) to the apparatus. The performing and/or controlling (e.g. execution) of the releasing is based, at least in part, on the determined conditional cell release information. For instance, in case the at least one condition (e.g. CPR condition) is determined (e.g. evaluated) to represent that the at least one condition is met to execute the releasing of the configured cell, the apparatus may perform and/or control the releasing, e.g. without further signaling (of the apparatus) taking place. This may be allowed since the apparatus may have obtained (e.g. received) information via RRC signaling prior to the determining of the conditional cell release information and releasing of the configured cell, wherein the information enable the apparatus to perform and/or control example embodiments of the CPR procedure according to all exemplary aspects.

The releasing of the configured cell (e.g. PSCell) may thus be done in a quick and safe manner. Since the releasing of the configured cell (e.g. PSCell) can be performed by the apparatus, e.g. risking of a link failure may be avoided.

In this way, a Conditional PSCell Release (CPR) procedure is enabled. Example embodiments according to all exemplary aspects provide related message exchange (e.g. via RRC signaling), e.g. in order to allow the apparatus according to the first exemplary aspect (e.g. a respective mobile device, or a UE) to release its PSCell when the at least one condition is met (without further signaling between the apparatus (e.g. respective mobile device, or a UE) and the mobile communication network).

There may be four different cases of such a CPR procedure:

MN-initiated determining and releasing of a configured cell (e.g. Conditional PSCell Release) with bearer remapping;

MN-initiated determining and releasing of a configured cell (e.g. Conditional PSCell Release) without bearer remapping;

SN-initiated determining and releasing of a configured cell (e.g. Conditional PSCell Release) with bearer remapping; and SN-initiated determining and releasing of a configured cell (e.g. Conditional PSCell Release) without bearer remapping.

The term "initiated", as used herein, refers to the configuring of the CPR procedure to enable the apparatus according to the first exemplary aspect to perform and/or control the method according to the first exemplary aspect. Thus, after the CPR procedure is initiated by a respective MN of the mobile communication network or by a SN of the mobile communication network, the apparatus is enabled to determine the conditional cell release information, e.g. evaluating whether or not the at least one condition is met to release (e.g. de-configure) a link established between the apparatus and its respective PSCell with which the apparatus is configured (e.g. a link established to the PSCell), to name but one non-limiting example. Due to the CPR procedure, the releasing of the configured cell may be performed without further signaling being beneficial prior to the actual releasing of the configured cell.

Bearer remapping when performing and/or controlling the releasing of a respective configured cell may be optional. More details on such a remapping or releasing of one or more bearers are disclosed below.

According to an exemplary embodiment of the first exemplary aspect, the method further comprises:

obtaining reconfiguration information indicative of one or more conditions based on which the releasing of the configured cell is to be performed, wherein the conditional cell release information is determined based, at least in part, on the reconfiguration information.

The reconfiguration information may be obtained, by receiving the reconfiguration information, e.g. from a respective MN of the mobile communication network. The reconfiguration information may be obtained via a RRC signaling enabled by the mobile communication network. For instance, the reconfiguration information may be indicative of or comprise information enabling the apparatus to perform and/or control the method according to the first exemplary aspect. For instance, the reconfiguration information may comprise the at least one condition that is evaluated for the determining of the conditional cell release information. The at least one condition may be part of the one or more conditions that the reconfiguration information is indicative or, or may be comprised or represented by the reconfiguration information.

The reconfiguration information may be a RRC (e.g. Re-) configuration message, or be a part of it. Additionally or alternatively, the reconfiguration information may be comprised by such a RRC configuration message provided (e.g. sent) to the apparatus via RRC signaling. The reconfiguration information may be obtained (e.g. received) from a respective MN of the mobile communication network.

Such a respective MN of the mobile communication network may have initiated the providing (e.g. via a respective RRC Reconfiguration message) of the reconfiguration information to the apparatus, thus, enabling the apparatus to obtain the reconfiguration information. A respective MN of the mobile communication network may have determined that the apparatus is allowed or to be allowed to release its configured cell of a cell group (e.g. a PSCell) when the at least one condition is met. In this case, the CPR procedure is MN-initiated. As mentioned, the apparatus may be allowed to release its configured cell (e.g. PSCell of a SCG) without further signaling between the apparatus and the mobile communication network, e.g. a respective MN and/ or SN of the mobile communication network. Thus, the apparatus may execute the releasing of the configured cell. For instance, the respective MN may prepare the respective SN serving the configured cell (e.g. PSCell) to the apparatus for the CPR procedure, in particular that the apparatus releases the configured cell without further signaling taking place. Then, the respective SN may be prepared (e.g. knows how to perform one or more bearer remapping) for a respective CPR procedure executed by the apparatus in case the at least one condition is met, to name but one non-limiting example.

Additionally or alternatively, a respective SN of the mobile communication network may have determined that the apparatus is allowed or to be allowed to release its configured cell of a cell group (e.g. a PSCell) when the at least one condition is met. In this case, the CPR procedure is SN-initiated. Further, in this case, the reconfiguration information may still be provided from a respective MN of the mobile communication network to the apparatus. In contrast to the MN-initiated CPR procedure disclosed above, the MN may have obtained (e.g. received) a request for allowing the apparatus to perform and/or control the CPR procedure, e.g. according to the method of the first exemplary aspect. Such a request may for instance be obtained by the respective MN via a so-called SN Release Required message. Such a SN Release Required message may comprise a CPR request to enable the MN to configure the apparatus accordingly. Such a SN Release Required message may be provided (e.g. sent) by the respective SN to the respective MN of the mobile communication network, e.g. the respective SN may have determined that e.g. based on one or more URLLC services mapped to some radio bearers (e.g. between the apparatus and the SN via the PSCell) that the apparatus shall be prepared for possible (e.g. SN's) coverage loss, to name but one non-limiting example.

According to an exemplary embodiment of the first exemplary aspect, the method further comprises:

indicating an execution of the release of the configured cell.

The apparatus may indicate that the releasing of the configured cell (e.g. PSCell) is or was executed. To indicate this, the apparatus may provide (e.g. send) a respective information, or a respective RRC signaling message, to name but a few non-limiting examples. The apparatus may indicate the releasing of the configured cell (e.g. PSCell) to a respective MN of the mobile communication network. The apparatus may have a link established to the respective MN of the mobile communication network, e.g. via a reliable communication link.

The indicating of the execution is provided to the MN that may serve a PCell of the mobile communication network to the apparatus via such a reliable link. The indication may represent a confirmation to the mobile communication network that the apparatus has (e.g. already and/or successfully) released the configured cell (e.g. PSCell of the SCG) e.g. based, at least in part, on the previously obtained (e.g. received) reconfiguration information (e.g. comprising the at least one condition; e.g. CPR condition). The indicating may be provided (e.g. sent) to the respective MN of the mobile communication network, since such a reliable link may be present between the apparatus and the respective MN even after releasing the configured cell (e.g. PSCell of the SCG). The respective MN of the mobile communication network is part of the MCG, which respective configured cell may not be released. Thus, e.g. the reliable link to the respective MN may be available for indicating the execution of the release to the respective MN of the mobile communication network.

The indicating may be performed and/or controlled, e.g. by providing e.g. an ULInformationTransferMRDC message. Such an ULInformationTransferMRDC message may be sent via a reliable link to the respective MN, as disclosed above. Such an ULInformationTransferMRDC message may include or comprise, at least a part of it, an indication of CPR execution. This may for instance be a flag (e.g. binary value) to enable the respective MN to obtain the indication of the execution of the release of the configured cell, to name but one non-limiting example.

According to an exemplary embodiment of the first exemplary aspect, the reconfiguration information is further indicative of bearer remapping information enabling a remapping of one or more configured bearers, wherein the method further comprises:

remapping or releasing of one or more used bearers of the configured cell based, at least in part, on the bearer remapping information.

A bearer, as used herein, may be understood as a tunnel or link that is used to connect the apparatus according to the first exemplary aspect with the mobile communication network, or vice versa. The apparatus may have one or more of such bearers established between the apparatus and a respective radio access node (e.g. the SN) of the SCG. A respective bearer may terminate at the respective SN (in case of EN-DC or multi-connectivity (MC), more specifically at a respective gNB). As used here, such a terminating refers to which respective radio access node of the mobile communication network (e.g. MN and/or SN) may be used for a potential continuation of a respective bearer. As used herein, MN-terminated bearer refers to a radio bearer for which PDCP (Packet Data Convergence Protocol) is located in the MN, e.g. in MR-DC. As used herein, SN-terminated bearer refers to a radio bearer for which PDCP is located in the SN, e.g. in MR-DC.

To enable releasing of the configured cell (e.g. PSCell of the SCG), it may be beneficial to release or remap one or more of such bearers, in particular SN-terminated bearers. For instance, SN-terminated bearer(s) may have no resources from the MN, so such SN-terminated bearers may be lost (e.g. entirely) after CPR. Thus, it may be beneficial to remap such SN-terminated bearer(s). The one or more bearers may for instance be remapped from being SCG radio bearers (e.g. of the PSCell) to a MCG link, so that after the releasing of the configured cell (e.g. PSCell) of the cell group (e.g. SCG), those respective one or more bearers may still be served by the mobile communication network. Such one or more bearers may be served via the respective MN of the MCG of the mobile communication network in contrast to being served via the respective SN of the SCG prior to performing and/or controlling the releasing of the configured cell (e.g. PSCell).

The bearer remapping information may further be indicative of whether the one or more bearer are to be released or to be remapped. The remapping of the one or more bearers may be done between the apparatus (e.g. UE) and the respective MN, thus, via the MN. Such a remapping of the one or more bearers upon CPR execution may be beneficial so that there is no data interruption even though the configured cell (e.g. PSCell) is released.

The reconfiguration information obtained by the apparatus may for instance be further indicative of whether or not such a bearer remapping should take place e.g. if a CPR condition is met. For instance, bearer remapping may not be allowed in case e.g. one or more SCG-terminated bearers (that are configured) are to be released when the configured cell (PSCell) of the cell group (SCG) is released. As disclosed above, such SCG-terminated bearer(s) may have no resources from the MN, so such SN-terminated bearers may be lost (e.g. entirely) after the execution of CPR. Thus, it may be beneficial to remap such SCG-terminated bearer(s).

In order to ensure optimal performance, bearer remapping may be preferred. However, CPR without bearer remapping may be applicable if the one or more bearers are MN-terminated bearers. Such MN-terminated may comprise using SCG resources, or if the respective MN cannot fetch the bearer remapping information indicative of enabling the remapping of the one or more bearers (e.g. terminating at the configured cell, or SN of the cell group (e.g. SCG)) from the respective SN (e.g. directly) prior to CPR execution, in which case remapping of the respective one or more bearers may not be possible. Then, in case one or more bearers are configured, the respective bearers may be released (e.g. de-configured).

According to an exemplary embodiment of all exemplary aspects, a respective condition of the one or more conditions of the reconfiguration information and/or the at least one condition is at least one of:

at least one Ax event of the mobile communication network;

a lack of data in a (e.g. uplink and/or downlink) transmission buffer; and/or a loss of coverage provided by the configured cell.

Such at least one Ax event of the mobile communication network may for instance be that a serving of the apparatus according to the first exemplary aspect by a respective cell group (e.g. SCG) becomes worse than a pre-defined or defined according to pre-determines rules threshold. Then, if this condition is met, the apparatus according to the first exemplary aspect may perform and/or control the releasing of the configured cell (e.g. PSCell) of the cell group. The threshold may for instance be a minimum quality a respective channel may have. Such a channel quality may for instance be measurable and be represented by a CQI (Channel Quality Indicator), to name but one non-limiting example.

Lack of data may lead to releasing the configured cell (e.g. PSCell) when there is no data (e.g. lack of data in transmission buffer (e.g. UL (uplink) transmission buffer)) to be sent towards that cell. So the apparatus (e.g. UE) may stay in CONNECTED mode (e.g. RRC_CONNECTEC), just an additional cell (e.g. PSCell) may be released as it may have been configured for data boosting purposes and such purpose ceased to exist.

Further, the releasing of the configured cell (e.g. PSCell) of the cell group by the apparatus according to the first exemplary aspect may be performed and/or controlled in case the respective SN of the cell group (e.g. SCG) may know that a loss of coverage provided by the configured cell may occur. This may be obtainable by the apparatus by performing and/or controlling one or more measurements, e.g. when determining the conditional cell release information. Such measurements may be indicative of whether or not such a loss of coverage may occur. Then, if this condition is met, the apparatus according to the first exemplary aspect may perform and/or control the releasing of the configured cell (e.g. PSCell) of the cell group.

As long as the at least one condition (e.g. of the one or more conditions of the reconfiguration information) is not met, the respective MN and/or the respective SN of the mobile communication network may be enabled to reconfigure the apparatus according to the first exemplary aspect (e.g. via respective RRC signaling), if beneficial. For instance, one or more (other) conditions to be met for performing and/or controlling the CPR may be signaled to the apparatus.

According to an exemplary embodiment of the first exemplary aspect, the remapping or releasing of the one or more bearers is performed via a MN of the mobile communication network.

The remapping or releasing of the one or more bearers may be performed and/or controlled via a reliable link of the apparatus to a respective MN of the mobile communication network. The respective MN may serve a PCell of the mobile communication network to the apparatus that may e.g. comprise such a reliable link. The respective bearers may be reconfigured via the respective MN enabling that transmission can still take place via the remapped bearers. This may allow avoiding of a link failure.

According to an exemplary embodiment of the first exemplary aspect, the reconfiguration information is obtained when the cell (e.g. of the cell group; e.g. a respective SN serving the cell to be configured to the apparatus) of the mobile communication network is configured. Thus, the reconfiguration information may be obtained when the cell is configured, e.g. when a SN addition procedure between an apparatus according to the second exemplary aspect (e.g. MN) and a SN of the mobile communication network takes place. Additionally or alternatively, the reconfiguration information may be obtained when the cell is configured, e.g. when a RRC reconfiguration (e.g. part of a SN Release Required procedure) as per MN-Initiated/SN-Initiated CPR procedure between an apparatus according to the second exemplary aspect (e.g. MN) and a SN of the mobile communication network takes place. Such RRC reconfiguration message may comprise or include one or more (CPR) conditions and optionally bearer remapping information.

For instance, in order to enable the apparatus to perform and/or control the method according to the first exemplary aspect, the respective CPR conditions (e.g. the at least one condition) and optionally, the bearer remapping information may not be needed to be to signaled to the apparatus via dedicated signaling (e.g. accompanying or being comprised by a RRC Reconfiguration message, as disclosed above), but the respective CPR conditions (e.g. the at least one condition) and optionally, the bearer remapping information may be provided by a respective MN to the apparatus when the respective MN performs and/or controls SN addition, to name but one non-limiting example.

According to an exemplary embodiment of the first exemplary aspect, the configured cell is a PSCell (e.g. of a respective SCG of the mobile communication network.

According to an exemplary embodiment of the first exemplary aspect, the method further comprises prior to determining conditional cell release information:

determining conditional cell change information indicative of at least one change condition from a configured cell; and changing the configured cell to the other cell based, at least in part, on the conditional cell change information; and postponing the determining of the conditional cell release information until the changing of the configured cell to the other cell is completed.

The apparatus may be enabled to perform and/or control both above disclosed CPR procedure and, additionally, a CPC (Conditional PSCell Change) procedure. The latter may be configured towards the apparatus, e.g. by the apparatus obtaining a respective RRC Reconfiguration message, e.g. from a respective MN of the mobile communication network. Such a respective RRC Reconfiguration message may comprise or represent, at least a part of it, the at least one change condition, which has to met for the apparatus performing changing of a configured cell (e.g. PSCell) to another cell (e.g. of a respective same or different cell group (e.g. SCG) from which it is changed). The apparatus may determine the conditional cell change information, e.g. by evaluating whether or not the at least one change condition is met. Then, the apparatus may perform and/or control (e.g. execute) the conditional cell change. Such CPC may be configured towards the apparatus after the CPR configuration. The CPR execution of the apparatus may be based on a target PSCell condition, wherein the target PSCell is a cell to which the apparatus may change from a configured cell (e.g. also a PSCell) to another cell (e.g. another PSCell).

The apparatus may not determine the conditional cell release information until the CPC is complete. For instance, on CPC completion, the determining of the conditional cell release information can be started (or resumed) on the new configured cell (e.g. PSCell). The CPC configuration or respectively information that may be obtained by the apparatus may comprise a parameter indicative of if a determining of the conditional release information can take place. For instance, a respective SN of the configured cell (e.g. PSCell)—after a change of the configured cell was performed and/or controlled—may not indicate that the determining of the conditional release information can take place. Then, the apparatus may release (e.g. de-configure) the one or more conditions so that the method according to the first exemplary aspect is not performed and/or controlled by the apparatus anymore. The determining of the conditional cell release information can take place when the configured cell is the new configured cell (e.g. PSCell), thus, after the cell change. That this may be performed and/or controlled may be represented by the same parameter being set to a different (e.g. binary) value, to name but one non-limiting example.

Further, the determining of the conditional cell release information may comprise checking one or more measurements of one or more CPC target cells at the respective time. The checking may comprise determining if any of the one or more CPC target cells is better than a serving by the configured cell (e.g. PSCell) of the cell group (e.g. SCG) than a pre-defined or defined according to pre-determines rules threshold, e.g. represented by the at least one condition. Then, the apparatus may postpone the releasing of the configured cell, thus, postpone the CPR execution as enabled by example embodiments according to all exemplary aspects.

The apparatus according to the second exemplary aspect may request a conditional cell release procedure of a configured cell of a cell group of a mobile communication network from a respective SN of the mobile communication network. Alternatively, the apparatus according to the second exemplary aspect may obtain such a request for a conditional cell release of a configured cell (e.g. PSCell) of a cell group (e.g. SCG), e.g. from a respective SN of a mobile communication network. The request may be provided (e.g. sent) to the respective SN so that the respective SN may be set up or be prepared for a releasing of a configured cell that is to be performed and/or controlled by the apparatus according to the first exemplary aspect.

According to an exemplary embodiment of the second exemplary aspect, the method further comprises:

obtaining an indication of an execution of the cell release of the configured cell.

When the apparatus according to the first exemplary aspect has released a respective configured cell (e.g. PSCell), the apparatus according to the second exemplary aspect may obtain (e.g. receive) an indication of an execution of the cell release of the configured cell, as disclosed above with regard to example embodiment according to the first exemplary aspect.

This may be relayed to the respective SN that has served the released cell. The respective SN may start data forwarding (e.g. to the apparatus (e.g. a MN serving a PCELL to the apparatus according to the first exemplary aspect) upon obtaining (e.g. reception) of the indication. The data that is forwarded by the respective SN to the apparatus may be obtained (e.g. received). The forwarded data may comprise data intended to be provided from the respective SN to the apparatus according to the first exemplary aspect, to name but one non-limiting example, so that the apparatus (according to the second exemplary aspect) is enabled to provide (e.g. sent) the respective data to the apparatus according to the first exemplary aspect without a risk of a link failure.

According to an exemplary embodiment of the second exemplary aspect, the request for a conditional cell release comprises at least one condition based on which the configured cell is released. The at least one condition may be evaluated (e.g. determined) by the apparatus according to the first exemplary aspect to determine whether or not a release of a configured cell (e.g. PSCell) is to be performed (e.g. executed).

According to an exemplary embodiment of the second exemplary aspect, the method further comprises upon obtaining the indication of an execution of the released of the configured cell:

remapping or releasing one or more used bearers (e.g. to the apparatus instead of a respective SN which cell (e.g. PSCell) is released) based, at least in part, on a bearer remapping information enabling a remapping of one or more configured bearers.

The apparatus may perform and/or control a remapping of one or more bearers that may be configured between the apparatus according to the first exemplary aspect and the respective SN which may have served and the configured cell (e.g. PSCell) that is to be released by the apparatus according to the first exemplary aspect. This may allow the remapping of the one or more bearer to take place via the apparatus (e.g. a respective MN) instead of a respective SN of the mobile communication network.

According to an exemplary embodiment of the second exemplary aspect, the obtained request for a conditional cell release comprises an indication for performing the conditional cell release procedure and/or a request for remapping one or more bearers (e.g. served by a respective SN of the cell group (e.g. SCG)). The request for remapping of one or more bearers may comprise bearer remapping information enabling to remap one or more bearers prior to the releasing of the configured cell that may be performed and/or controlled by the apparatus according to the first exemplary aspect in case the at least one condition is met.

According to an exemplary embodiment of the second exemplary aspect, the method further comprises:

providing reconfiguration information indicative of one or more conditions (e.g. comprising at least one condition that the determining of the conditional cell release information of the apparatus according to the first exemplary aspect performs and/or controls) enabling a mobile device of the mobile communication network (e.g. served by a respective SN) to release the configured cell.

The reconfiguration information may be obtained from a respective SN and then be provided (e.g. relayed) to the apparatus according to the first exemplary aspect by the apparatus according to the second exemplary aspect. Additionally or alternatively, the reconfiguration information may be provided (e.g. directly) from the apparatus according to the second exemplary aspect to the apparatus according to the first exemplary aspect.

According to an exemplary embodiment of the second exemplary aspect, the remapping or releasing of the one or more bearers is performed via the apparatus node of the mobile communication network. The remapping or releasing of the one or more bearers may be performed and/or controlled as disclosed above with regard to example embodiments according to the first exemplary aspect.

According to an exemplary embodiment of the second exemplary aspect, the apparatus is a MN (master radio access node) (e.g. of a MCG) of the mobile communication network.

According to an exemplary embodiment of the second exemplary aspect, the configured cell is a PSCell (e.g. of a SCG comprising a respective SN serving the apparatus according to the first exemplary aspect) of the mobile communication network.

The features and example embodiments described above may equally pertain to the different aspects.

It is to be understood that the embodiments and aspects in this section is merely by way of examples and non-limiting.

Other features will become apparent from the following detailed description considered in conjunction with the accompanying drawings. It is to be understood, however, that the drawings are designed solely for purposes of illustration, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the exemplary embodiments and shall be understood to complement and be read together with the description as provided in the above summary section of this specification.

Figure 1:
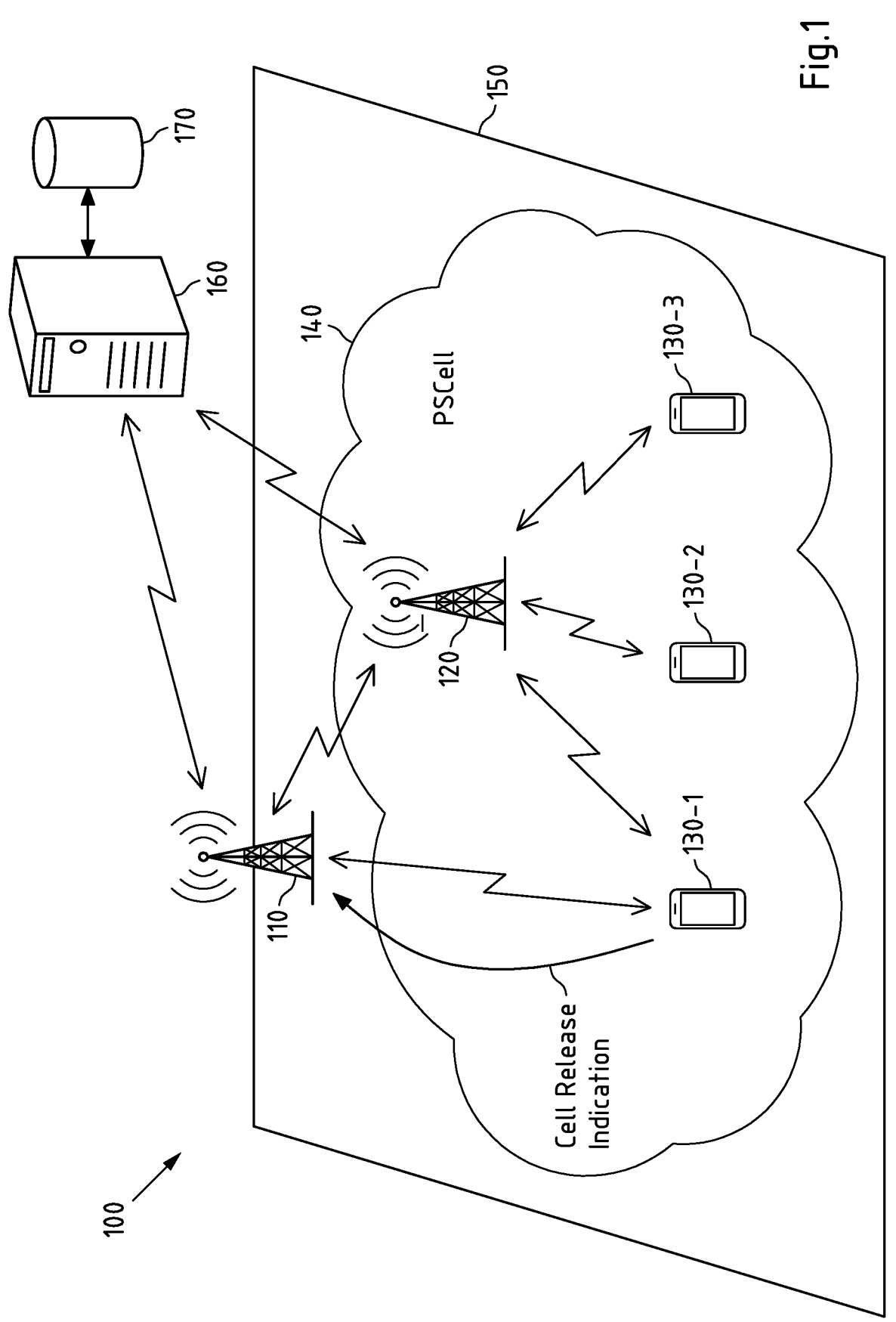
FIG. 1 a schematic block diagram of a system according to an exemplary aspect.

FIG. 1 is an example of a schematic high-level block diagram of a system 100 that is configured to perform and/or control the respective method(s) according to all exemplary aspects.

System 100 comprises a mobile communication network 150, which is schematically shown by the rectangular shape. It will be understood that this shape does not represent a coverage area of the mobile communication network 150, but a sort of grouping of one or more entities that may utilize the mobile communication network 150.

System 100 comprises one or more mobile devices 130-1, 130-2, and 130-3. A respective mobile device 130-1, 130-2, and 130-3 may be an apparatus according to the first exemplary aspect.

The system 100 further comprises a plurality of base stations respective radio access nodes, at present a MN 110, and a SN 120. One or more signals of the MN 110 and the SN 120 are observable by the mobile devices 130-1, 130-2, and 130-3. The MN 110 and the SN 120 are part of the mobile communication network 150. The MN may be an apparatus according to the second exemplary aspect. The MN 110 and the SN 120 may communicate with each other. The SN may form or provide a PSCell 140, shown by the area within the mobile communication network 150 labeled with "PSCell". It will be understood that the shape does not represent in any kind of way a shape or boundaries of a coverage area. However, the mobile devices 130-1, 130-2 and 130-3 that are shown within the PSCell 140 of a SCG may be served by the SN 120 as a respective radio access node of a SCG with the PSCell 140. Thus, the SN 120 is a radio access node of a SCG of the mobile communication network 150. The MN 110 is a radio access node of a MCG of the mobile communication network 150.

Between the MN 110 and a respective mobile device (e.g. mobile device 130-1) a link may be established, e.g. via a reliable connection, also referred to as reliable link. The MN 110 may have a link established to a respective mobile device (e.g. mobile device 130-1) although the respective mobile device, in this example mobile device 130-1 may have released another link to a configured cell, such as a link to the PSCell 140 of the SCG of the SN 120.

The MN 110 and the SN 120 may be enabled to perform communication with and/or to another entities of the mobile communication network 150. Additional data and/or information transmission between such entities participating in the mobile communication network 150 may be performed and/or controlled via a server or server cloud 160, exemplary shown as a server 160. Such a server or server cloud 160 may control a provision of one or more services, e.g. to the mobile devices 130-1, 130-2, and/or 130-3, e.g. URLLC services to name but one non-limiting example. The server or server cloud 150 may also be comprised by the system 100. Further, an optional database 170 may be comprised by the system 100. Database 170 may be comprised by the server or server cloud 160, or may be connectable to the server or server cloud 160. The database 170 may store information, such as conditional cell release information, reconfiguration information, bearer remapping information, conditional cell change information, or a combination thereof, to name but a few non-limiting examples.

According to an example embodiment of all exemplary aspects, the MN 110 may provide reconfiguration information to a respective mobile device, e.g. mobile device 130-1. Mobile device 130-1 may have been configured with a cell, e.g. a PSCell 140 of a SCG (e.g. the SCG) served by SN 120. The reconfiguration information may enable the mobile device 130-1 to determine (e.g. evaluate) whether or not at least one condition to perform (e.g. execute) conditional cell release of the configured cell, here the PSCell 140. This may be done by the respective mobile device 130-1 by determining conditional cell release information. Based on such determined conditional cell release information, the respective mobile device 130-1 may release (e.g. de-configure) the respective PSCell 140 in case the at least one condition is met. The respective mobile device 130-1 may release the respective PSCell 140 without it being beneficial that (e.g. further or additional) signaling taking place between the mobile device 130-1 and further entities, e.g. the SN 120, of the mobile communication network 150. After the respective mobile device 130-1 has release the configured cell, here the PSCell 140, it indicates the releasing of the configured cell to the MN 110. This is illustrated in FIG. 1 by the arrow pointing from the respective mobile device 130-1 to the MN 110 having the label "Cell Release Indication".

To enable communication between the mobile device 130-1, 130-2, and 130-3, one or more radio access nodes of the mobile communication network 150, e.g. the MN 110 and/or the SN 120, and/or the mobile communication network 150 represented by server 160, and/or further entities not shown in FIG. 1, the mobile communication network 150 of the system 100 may be used. The mobile communication network may be a cellular (e.g. according to 3G/4G/5G/NR or future communication standard) network. Additionally or alternatively, a non-cellular communication network, such as a satellite-based communication network or the Internet may also be utilized to enable communication, to name but a few non-limiting examples. The communication may be wireless as is illustrated in FIG. 1 by the arrows pointing between the MN 110, the SN 120 and the mobile device 130-1, 130-2, and 130-3. In FIG. 1, the arrows point towards the mobile device 130 to illustrate that the signals of the base stations, e.g. MN 110 and/or SN 1203 are observable by the respective mobile devices 130-1, 130-2 and/or 130-3. It will be understood that information (e.g. RRC messages) may be sent from respective mobile devices 130-1, 130-2 and/or 130-to or via the MN 110 and/or the SN 110, as well as between the MN 110 and the SN 120. Further communication is illustrated by the arrows pointing between the MN 110 and/or the SN 120 the server 160 representing the mobile communication network 150 and/or other entities participating or utilizing the mobile communication network 150.

Example embodiments enabling respective method(s) according to all exemplary aspects may utilize the architecture shown by the system 100 of FIG. 1.

Figure 2:
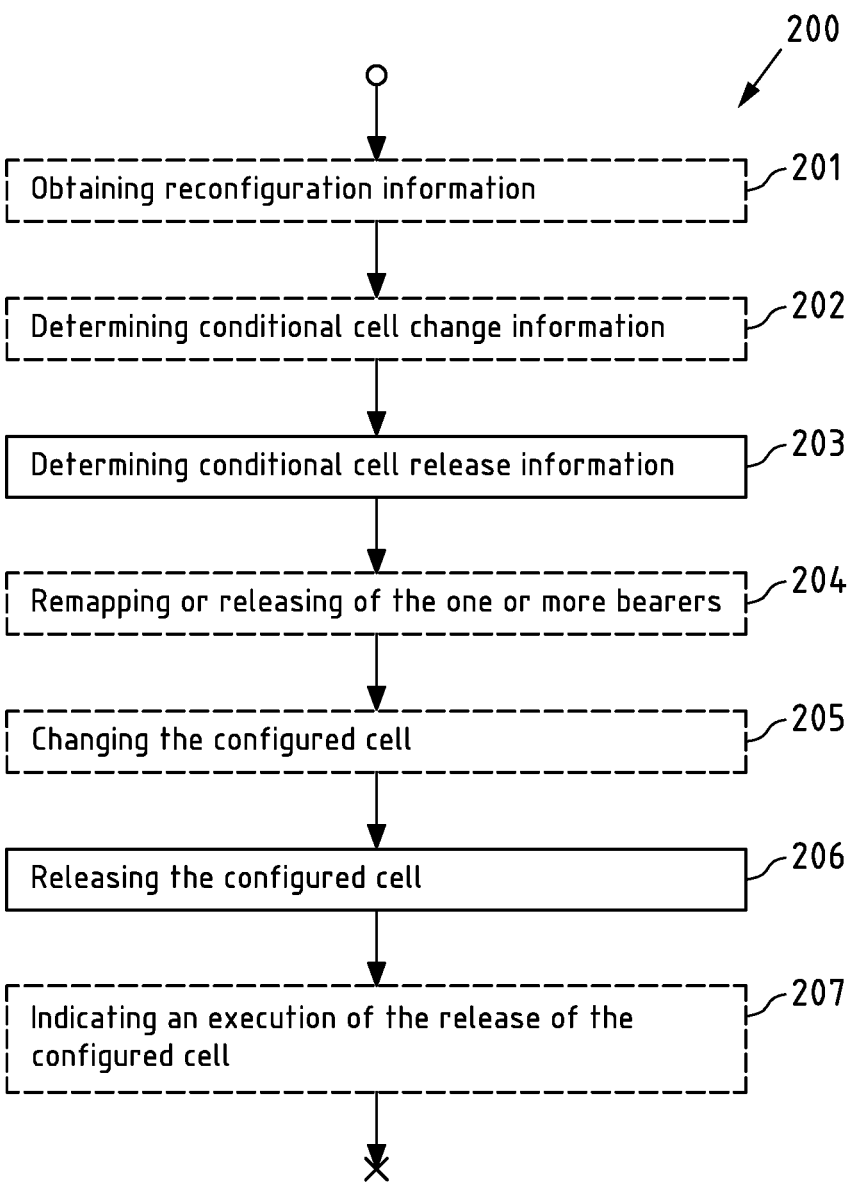
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a mobile device, e.g. mobile device 130-1, 130-2 and/or 130-3 of FIG. 1.

In an optional first step 201, reconfiguration information are obtained, e.g. by obtaining (e.g. receiving) the reconfiguration information from a MN (e.g. MN 110 of FIG. 1) of a mobile communication network (e.g. mobile communication network 150 of FIG. 1). The provision of the reconfiguration information so that the reconfiguration information is obtained, may be triggered or initiated by the MN (see steps 301 and 302 of FIG. 3), or by a respective SN (e.g. SN 120 of FIG. 1) so that the MN provides the reconfiguration information to the respective mobile device. With obtaining of such reconfiguration information, a respective mobile device (e.g. mobile device 130-1, 130-2 and/or 130-3 of FIG. 1) is enabled to perform a method for a CPR procedure according to example embodiments of all exemplary aspects.

In an optional second step 202, conditional cell change information are determined. At least one condition, e.g. part of the reconfiguration information obtained in step 201, is evaluated, and when the at least one condition is met, a change of a configured cell of the apparatus performing and/or controlling the flowchart 200 is performed and/or controlled.

In a third step 203, conditional cell release information are determined. Step 203 may for instance be dependent on a result of the determined conditional cell change information of step 202. For instance, in case it is determined that a respective cell to which the mobile device performing and/or controlling the flowchart 200 may change has a better channel quality than e.g. a PSCell to which the mobile device might establish a link in case the configured cell (e.g. PSCell of a SCG of the mobile communication network) is released, then instead of releasing the e.g. PSCell, changing of the configured cell to another cell (e.g. PSCell) of a SCG may be performed and/or controlled. This may also be performed as a change from a configured PSCell of a SCG to another PSCell of another SCG, to name but one further non-limiting example.

In an optional fourth step 204, one or more configured bearers (e.g. between the mobile device 130 and the SN 120 of the mobile communication network 150) are remapped or released. The one or more bearers may be remapped via and optionally to the MN, or the one or more bearers may be released via the MN. For remapping or releasing, dedicated signaling between the apparatus performing and/or controlling the flowchart 200 and the MN (e.g. via RRC messages) may be performed and/or controlled.

In an optional fifth step 205, a/the configured cell is changed. Instead of releasing a configured cell (e.g. PSCell 140 of FIG. 1), the apparatus performing and/or controlling the flowchart 200 may execute or initiate a change from the configured cell (e.g. PSCell 140 of FIG. 1) to another PSCell of the same (e.g. served by the same SN (e.g. SN 120 of FIG. 1) or different SCG of the mobile communication network (e.g. mobile communication network 150 of FIG. 1).

In a sixth step, the configured cell (e.g. PSCell 140 of FIG. 1) is released, e.g. by de-configuring a link between mobile device and the configured cell (e.g. a PSCell controlled by a SN (e.g. SN 120 of FIG. 1) of the mobile communication network.

In an optional seventh step 207, an execution of the release of the configured cell is indicated, e.g. to a MN (e.g. MN 110 of FIG. 1) of the mobile communication network.

Figure 3:
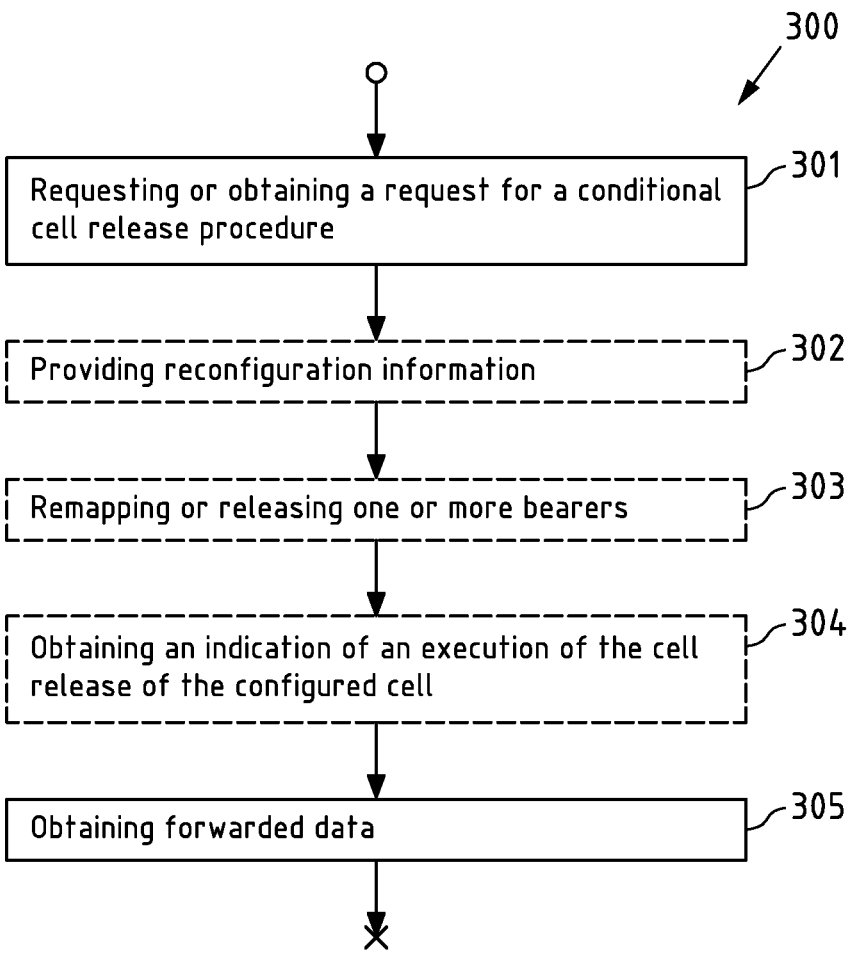
FIG. 3 a flowchart showing an example embodiment of a method according to the second exemplary aspect.

FIG. 3 is a flowchart 300 showing an example embodiment of a method according to the second exemplary aspect. This flowchart 300 may for instance be performed by a radio access node of a mobile communication network, e.g. MN 110 of FIG. 1.

In a first step 301, a request for a conditional cell release procedure is obtained, e.g. by receiving such a request from a respective SN (e.g. SN 120 of FIG. 1) of the mobile communication network. Alternatively, a conditional cell release procedure is requested from a respective SN (e.g. SN 120 of FIG. 1) of the mobile communication network so that based on such a request, the respective SN may provide reconfiguration information enabling a mobile device (e.g. mobile device 130 of FIG. 1) to release a configured cell (e.g. PSCell 140 of FIG. 1, e.g. of a SCG that may be controlled by the SN 120 of FIG. 1) without further signaling taking place between the mobile device and the mobile communication network, e.g. the MN and/or the SN of the mobile communication network.

In an optional second step 302, reconfiguration information are provided, e.g. by sending the reconfiguration information to the mobile device (e.g. mobile device 130-1 to 130-3 of FIG. 1).

In an optional third step 303, one or more bearers that are configured between the mobile device and the configured cell to be released (see step 206 of FIG. 2) are remapped e.g. via the MN of the mobile communication network, and between the MN and the respective mobile device, or in case a remapping of the one or more configured bearers is not possible, releasing of the one or more bearers may be done. Signaling to remap and release (e.g. de-configure) the one or more configured bearers may be done via the MN (e.g. MN 110 of FIG. 1) e.g. by dedicating signaling (e.g. RRC signaling) between a mobile device (e.g. mobile device 130-1 to 130-3 of FIG. 1) and the MN (e.g. MN 110 of FIG. 1). For enabling the remapping of the one or more bearer, bearer remapping information may be part of or comprised by the reconfiguration information. Such remapping of the one or more bearers may be done via RRC. Thus, the bearer remapping information may be provided with the reconfiguration information (e.g. CPR config) itself. However, updated or amended bearer remapping information may be provided thereafter, e.g. before at least one (e.g. CPR) condition may expire, to name but one non-limiting example.

In a fourth step 304, an indication of an execution of the cell release of the configured cell is obtained, e.g. by receiving such an indication from the mobile device that has released the configured cell. That the mobile device has evaluated CPR condition (see step 203 of FIG. 2) due to at least one condition was met, may be provided also to the respective SN upon reception of such an indication. It may be provided to the SN which cell (e.g. PSCell) that was configured to serve the mobile device was released by the mobile device.

In a fifth step 305, forwarded data is obtained, e.g. by receiving the data from the respective SN. Upon reception of the information (e.g. indication that the configured cell was released) from the MN, the respective SN may start data forwarding so that e.g. failure of a provision of one or more services that were served via the now released cell (e.g. PSCell of the SCG) can be avoided.

Flowcharts 200 of FIG. 2, and 300 of FIG. 3 may be performed and/or controlled together for enabling example embodiments of a method for a CPR procedure of all exemplary aspects. For instance, the step of providing reconfiguration information (see step 302 of FIG. 3) may be performed and/or controlled by the MN of FIG. 1. Then, the mobile device 130 of FIG. 1 may perform and/or control the steps of determining conditional cell release information (step 203 of FIG. 2), releasing the configured cell (see step 206 of FIG. 2) and optionally of indicating an execution of the release of the configured cell (see step 207 of FIG. 2). The indicating of the execution of the release of the configured cell is obtained (see step 304 of FIG. 3) by the apparatus performing and/or controlling the flowchart 300 of FIG. 3, and may be provided to a respective SN 120 of FIG. 1 that has served the released cell to the mobile device 130 of FIG. 1. The SN 120 of FIG. 1 stars forwarding of data to the apparatus performing and/or controlling the flowchart 300 of FIG. 3 (step 305 of FIG. 3).

In this way, one or more mobile devices (e.g. mobile device 130 of FIG. 1) performing and/or controlling flowchart 200 of FIG. 2, and a MN (e.g. MN 110 of FIG. 1) performing and/or controlling flowchart 300 of FIG. 3 may perform and/or control a method for a CPR procedure according to example embodiments of all exemplary aspects together (e.g. at least partially jointly).

Figure 4A:
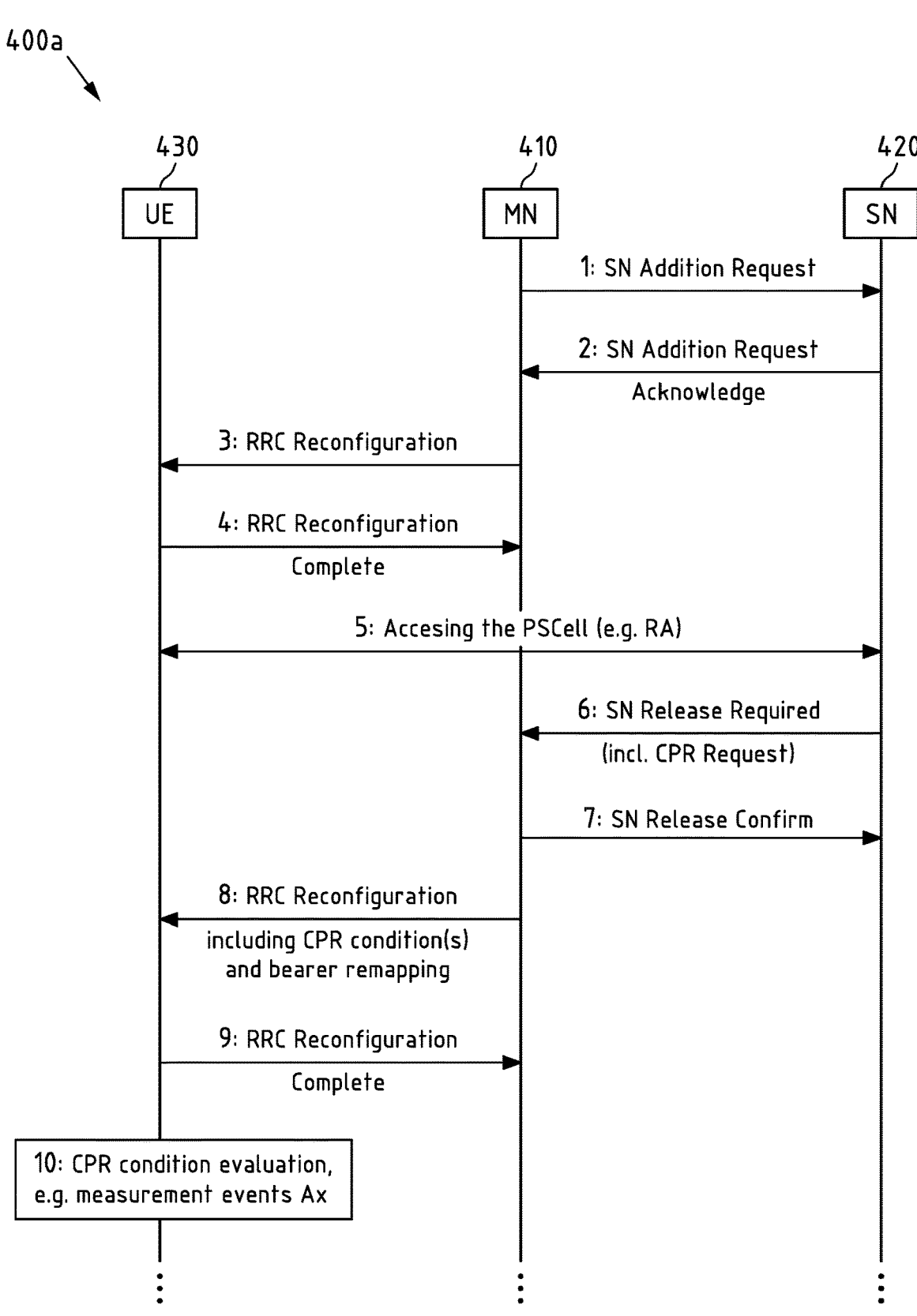
FIG. 4*a,b* respective signaling associated with example embodiments of all exemplary aspects.
Figure 4B:
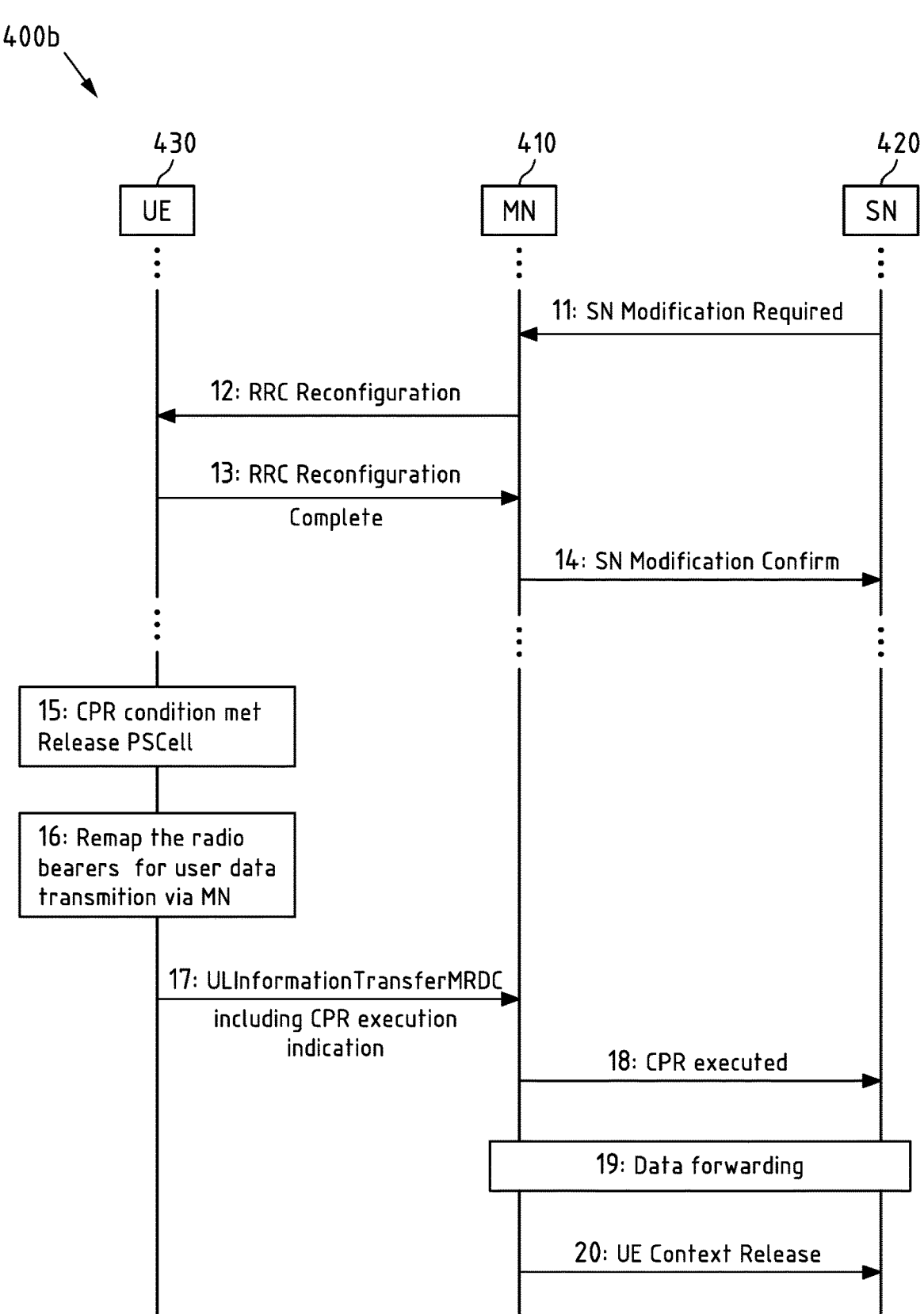

FIGS. 4a and 4b show a signaling associated with respective example embodiments of all exemplary aspects. The signaling is illustrated in a flowchart 400a of FIG. 4a, and in a flowchart 400b of FIG. 4b of an example embodiment according to all exemplary aspects showing a SN-initiated CPR procedure including bearer remapping.

Either flowchart 400a of FIG. 4a or 400b of FIG. 4b may be performed and/or controlled e.g. by the system of FIG. 1, and/or both flowcharts 400a of FIGS. 4a and 400b of FIG. 4b may be performed and/or controlled e.g. by the system of FIG. 1.

Steps 1-5 are performed as per legacy standard (e.g. 3GPP standardization; related specifications may be handled by RAN2 and RAN3; e.g. 3GPP Technical Specification (TS) 38.331, TS 37.340, TS 38.423, or a combination thereof, to name but a few non-limiting examples).

In FIG. 4a and/or 4b, the UE 430 may be an apparatus according to the first exemplary aspect (e.g. a respective mobile device 130-1, 130-2, or 130-3 of FIG. 1) performing and/or controlling a method according to the first exemplary aspect as disclosed above. Further, in FIG. 4a and/or 4b, the MN 410 may be an apparatus according to the second exemplary aspect (e.g. a respective MN 110 of FIG. 1) performing and/or controlling a method according to the second exemplary aspect as disclosed above.

SN Addition is requested (step 1) and acknowledged (step 2) by the SN 420, MN 410 reconfigured the UE 430 with SN Addition (step 3) and UE 430 accepts such reconfiguration (step 4: RRC Reconfiguration Complete). UE 430 accesses the SN 420 e.g. via Random Access (RA) procedure. The SN 420 may decide, e.g. based on URLCC services mapped to some radio bearers that the UE 410 shall be prepared for possible SN's 420 coverage loss. Therefore, in step 6, SN 420 initiates preparations to Conditional SN Release (CPR). It (the SN 420) initiates the CPR procedure (e.g. the MN 410 requests from the SN 420 or obtains from the SN 420 a request for a conditional cell release procedure) towards the MN 410, where CPR indication (possibly implicit), bearer configuration and the condition to be evaluated by the UE 430 are included.

The MN 410 reconfigures the UE 430 appropriately (step 8 and 9; e.g. the UE 430 obtains reconfiguration information from the MN 410)). In one of the options, there could be an indication (e.g. in the form of a Boolean flag) whether the bearers are released or remapped upon CPR (e.g. comprised by bearer remapping information). The UE 430 evaluates the CPR execution condition (step 10; determining conditional cell release information). Such condition can be equivalent to Ax event (TS 38.331, e.g. A2 (Serving becomes worse than threshold)). In other option, such condition can be equivalent to the lack of data in the UL transmission buffer, so PSCell (e.g. configured cell of the UE 430) can be immediately released. As long as the conditions is not met, the SN 420 or the MN 410 may reconfigure the UE 410, but the mapping information (e.g. bearer remapping information) must be updated in the MN 410 (thus, SRB3 reconfigurations are not possible).

CPR can be a long-lasting configuration, to be ready for a sudden loss of coverage. Thus, steps 11-14 illustrated in flowchart 400b of FIG. 4b depict that SN modification is still possible before CPR condition is met. When the condition is eventually fulfilled (step 15), the UE 430 executes the last received reconfiguration: it releases the link to the PSCell, remaps the bearers and sends the ULInformationTransfer-MRDC (step 13) to the MN 410 (PCell), wherein an indication of CPR execution may be included (e.g. indicating an execution of the release of the configured cell). Upon the reception of such indication (e.g. UL notification; e.g. ULInformationTransferMRDC), the MN 410 indicates to the SN 420 that data forwarding may start (this may require a new procedure, or e.g. Xn Address Indication may be reused) and applies previously agreed bearer remapping configuration (e.g. releasing or remapping of one or more bearers).

The UE 430 can be also configured with CPR already at the time when SN 420 is added (thus, in steps 1 and 2 of flowchart 400a of FIG. 4a). However, this may pose challenges to be overcome related to bearer remapping as at this stage it is not known exactly what kind of SCG radio bearer will the UE 430 have when CPR is executed. Nevertheless, this can be executed if bearer remapping is not allowed (i.e. all SCG bearers are released (e.g. via MN 410) when CPR is executed (e.g. by the UE 430).

Figure 5A:
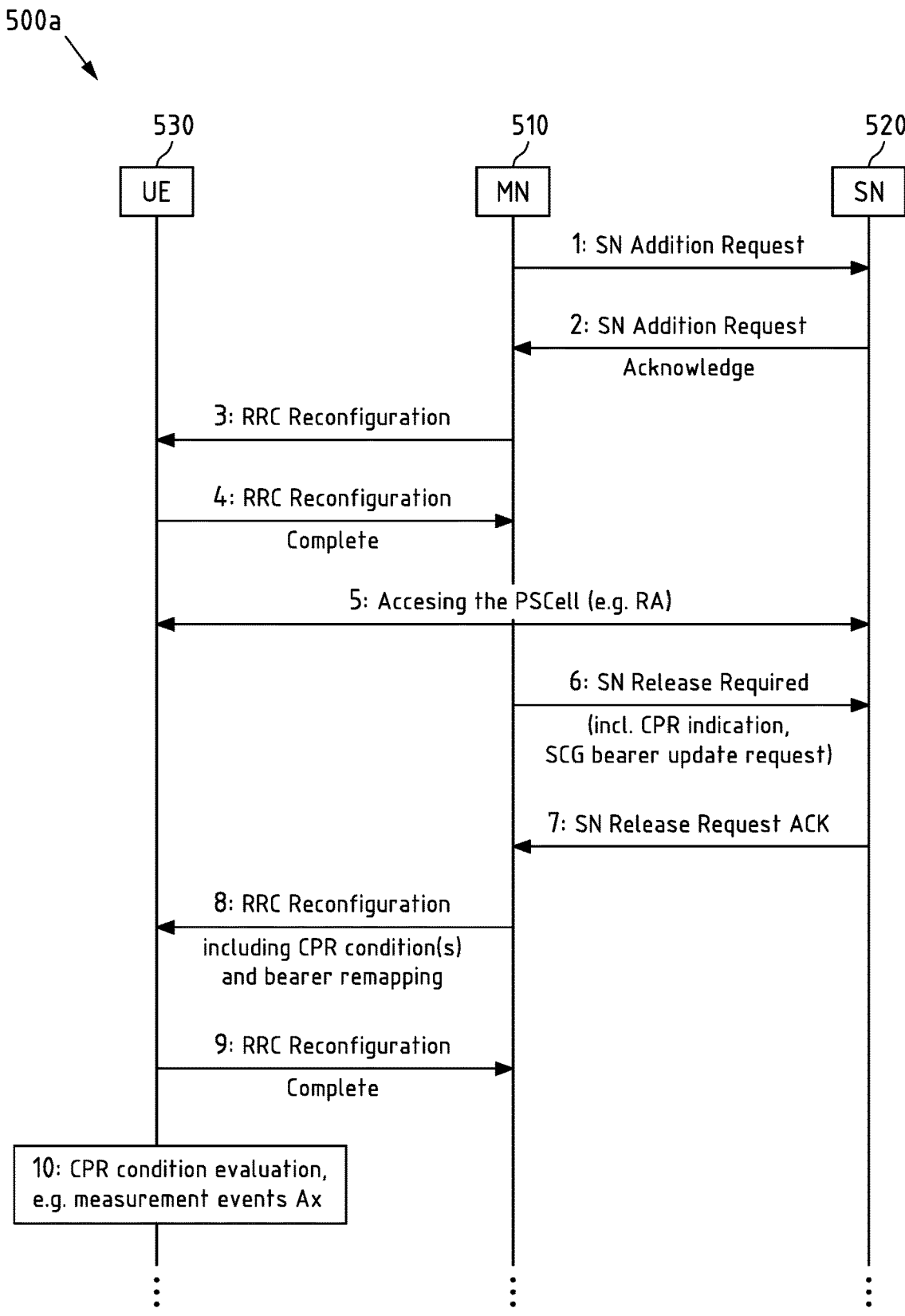
FIG. 5*a,b* respective signaling associated with another example embodiments of all exemplary aspects.
Figure 5B:
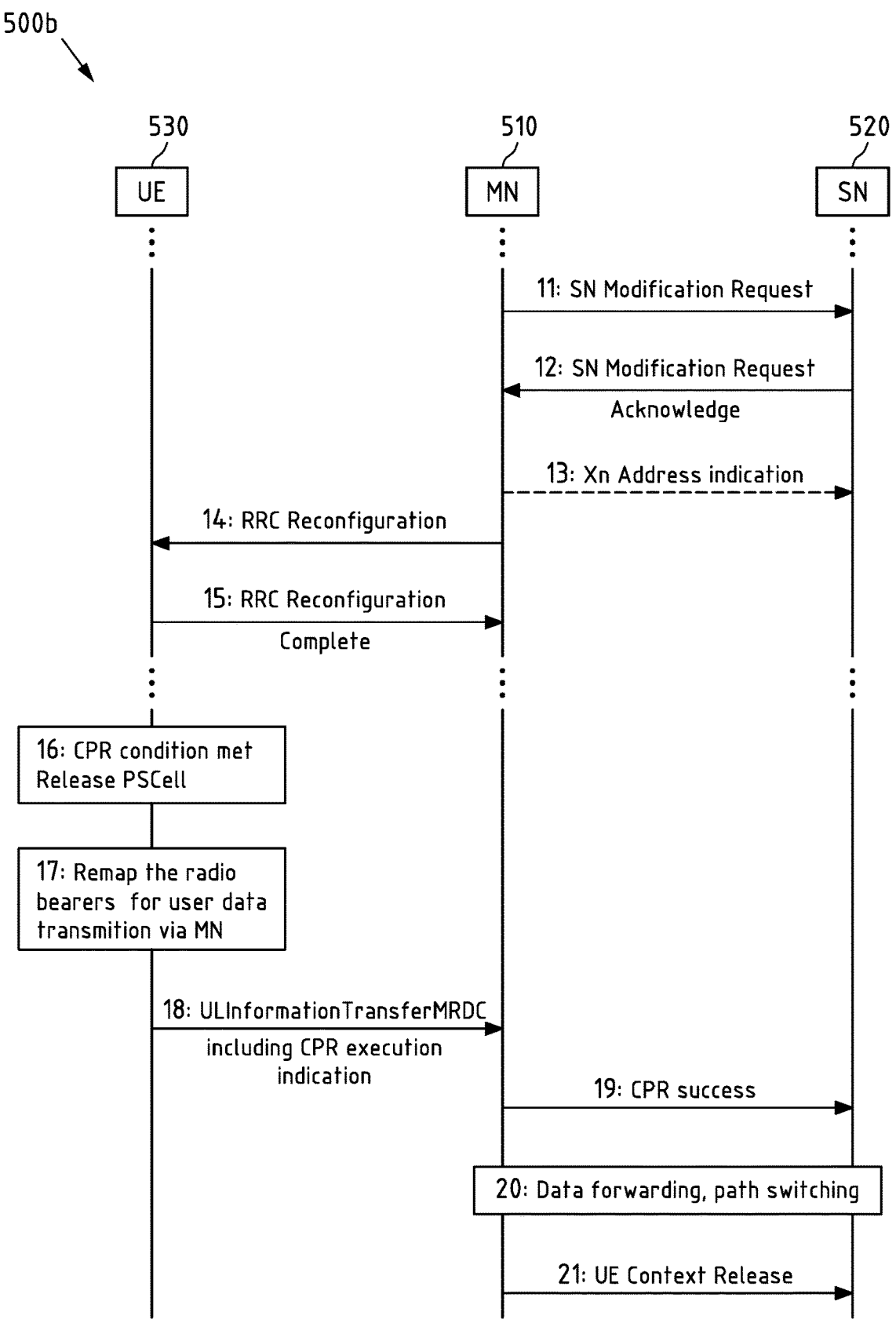

FIGS. 5a and 5b show a signaling associated with respective example embodiments of all exemplary aspects. The signaling is illustrated in a flowchart 500a of FIG. 5a, and in a flowchart 500b of FIG. 5b of an example embodiment according to all exemplary aspects showing a MN-initiated CPR procedure including bearer remapping. The procedure, wherein CPR is initiated by the MN, is depicted in FIGS. 5a and 5b. There are similarities to what has been proposed in FIGS. 4a and 4b, with such discernible difference that MN initiates the CPR configuration.

Either flowchart 500a of FIG. 5a or 500b of FIG. 5b may be performed and/or controlled e.g. by the system of FIG. 1, and/or both flowcharts 500a of FIG. 5a and 500b of FIG. 5b may be performed and/or controlled e.g. by the system of FIG. 1.

In FIG. 5a and/or 5b, the UE 530 may be an apparatus according to the first exemplary aspect (e.g. a respective mobile device 130-1, 130-2, or 130-3 of FIG. 1) performing and/or controlling a method according to the first exemplary aspect as disclosed above. Further, in FIG. 5a and/or 5b, the MN 510 may be an apparatus according to the second exemplary aspect (e.g. a respective MN 110 of FIG. 1) performing and/or controlling a method according to the second exemplary aspect as disclosed above.

Steps 1-5 may be the same as described above with regard to flowcharts 400a of FIG. 4a in the SN-initiated CPR procedure.

In step 6 of FIG. 5a, it is the MN 510 that asks (e.g. via a SN Release Request) SN 520 for providing the bearer configuration (so that remapping is possible) and asks the SN 520 to prepare for CPR (CPR indication in step 6 ensures the SN 520 does not execute this command immediately, but prepares for such action to be taken by the UE 530 in the future (see step 16 of FIG. 5b), upon condition fulfilment). SN 520 accepts such CPR SN Release and confirms that in step 7. The MN 510 can now reconfigure the UE 530 accordingly (steps 8 and 9). It is either the MN 510 that inserts a CPR condition before taking step 8 (so that the UE 530 may obtain reconfiguration information) or such condition is received from the SN 520 (e.g. measurement ID for PSCell) and then provided by the MN 510 to the UE 530.

Steps 11-15 of flowchart 500b of FIG. 5b show that SN's 520 configuration can still be modified before CPR condition is met. The remainder of the procedure—steps 16 to 21—may be the same as shown in flowchart 400b of FIG. 4b (SN-initiated CPR; steps 15 to 20 of FIG. 4b).

CPR and CPC may coexist. In one implementation, it may also be considered the coexistence of CPC and CPR. In case if there is CPC (Conditional PSCell Change) configured towards UE 530 after the CPR configuration, there can be another method to control the CPR execution based on the target PSCell condition of CPC.

If CPC execution is started, UE 530 should not evaluate for CPR until the CPC is complete. On CPC completion the CPR evaluation can be started on the new PSCell.

This can be controlled by additional parameter in CPC configuration: if SN 520 did not indicate the continuation of CPR after completing CPC, UE 530 releases CPR configuration. However, the network (e.g. mobile communication network 150 of FIG. 1) may want to allow the UE 530 to continue evaluating CPR in the new PSCell (especially if the CPC was intra-SN, within the same node). Then, the same parameter is set to a different value.

If CPR evaluation condition is met, UE 530 may check the measurement of CPC target cells at this time, if any of them is better than CPR condition by specific threshold, UE 530 may postpone the CPR execution.

Flowcharts 400a of FIG. 4a, 400b of FIG. 4b, 500a of FIG. 5a, and 500b of FIG. 5b show that this may allow that no additional signaling between the UE (430 and/or 530) and the network (e.g. MN 410 and/or MN 510) is needed, other than the confirmation (sent to the MN via reliable link) that the UE has already released the PSCell (e.g. PSCell 140 of FIG. 1) based on the previously received CPR condition. This may allow to release a configured cell (e.g. PSCell) in a quick and safe manner by the respective mobile device, without risking a link failure, which is essential for URLLC services.

Figure 6:
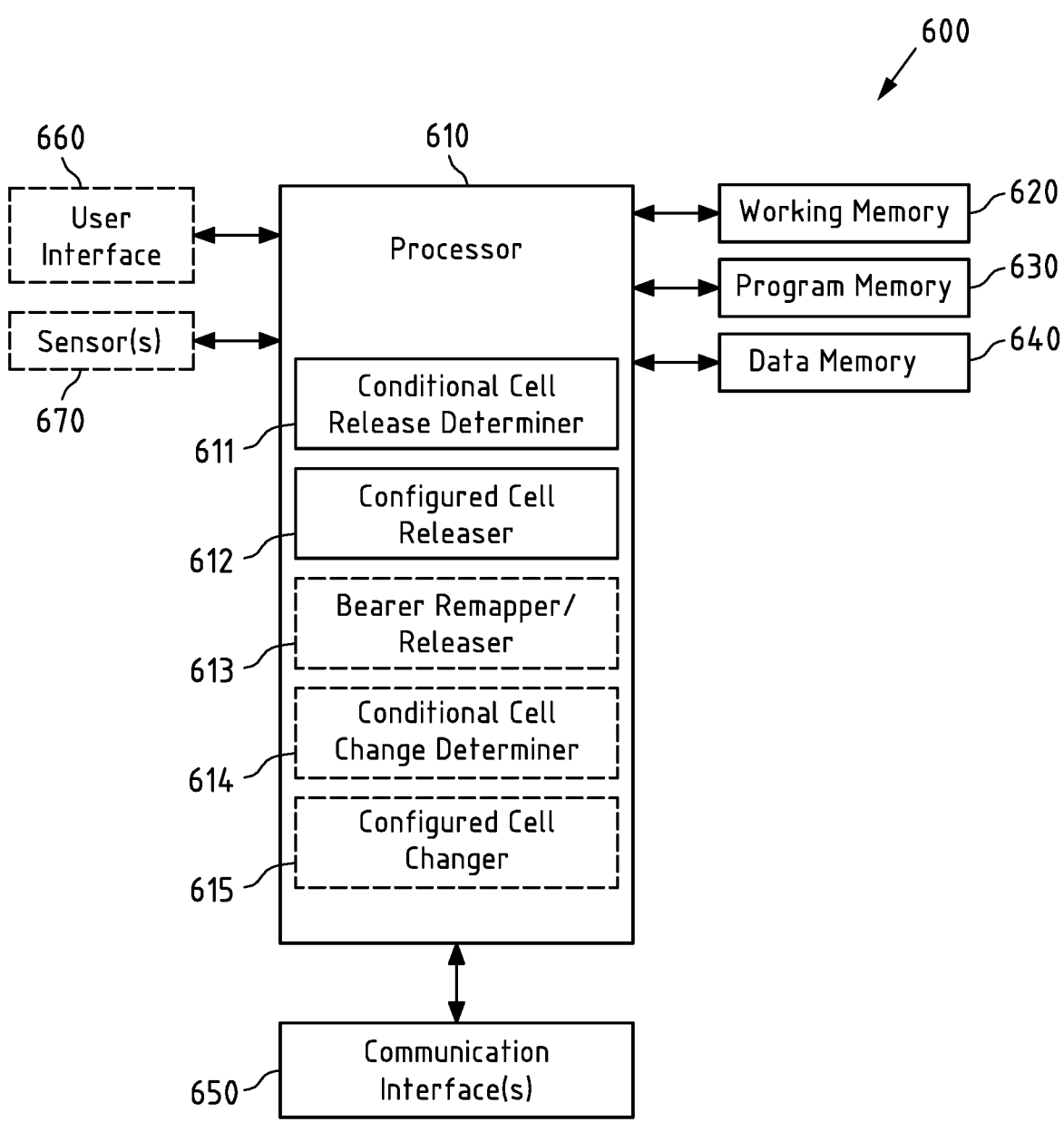
FIG. 6 a schematic block diagram of an apparatus configured to perform the method according to the first exemplary aspect.

FIG. 6 is a schematic block diagram of an apparatus 600 according to an exemplary aspect, which may for instance represent the mobile device 130 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the first exemplary aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the first exemplary aspect.

Processor 610 may for instance comprise a conditional cell release (e.g. information) determiner 611 as a functional and/or structural unit. Conditional cell release information determiner 611 may for instance be configured to determine Conditional cell release information (see step 203 of FIG. 2).

Processor 610 may for instance comprise a configured cell releaser 612 as a functional and/or structural unit. Configured cell releaser 612 may for instance be configured to release (e.g. de-configure) at least one configured cell (e.g. PSCell of a SCG; see step 206 of FIG. 2).

Processor 610 may for instance comprise an optional bearer remapper and/or releaser 613 as a functional and/or structural unit. Bearer remapper and/or releaser 613 may for instance be configured to remap and/or release one or more bearers (see step 204 of FIG. 2).

Processor 610 may for instance comprise an optional conditional cell change (e.g. information) determiner 614 as a functional and/or structural unit. Conditional cell change information determiner 614 may for instance be configured to determine conditional cell change information (see step 202 of FIG. 2).

Processor 610 may for instance comprise an optional configured cell changer 615 as a functional and/or structural unit. Configured cell changer 615 may for instance be configured to change a configured cell (e.g. PSCell of a first SCG) to another cell (e.g. PSCell of a second SCG) (see step 205 of FIG. 2).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store conditional cell release information, reconfiguration information, bearer remapping information, conditional cell change information, or a combination thereof, to name but a few non-limiting examples.

Communication interface(s) 650 enable apparatus 600 to communicate with other entities, e.g. with MN 110 and/or SN 120 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 600 to communicate with other entities, for instance with one or more further radio access nodes of the mobile communication network 150 of FIG. 1.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a barometric sensor, e.g. to gather pressure information.

Some or all of the components of the apparatus 600 may for instance be connected via a bus. Some or all of the components of the apparatus 600 may for instance be combined into one or more modules.

Figure 7:
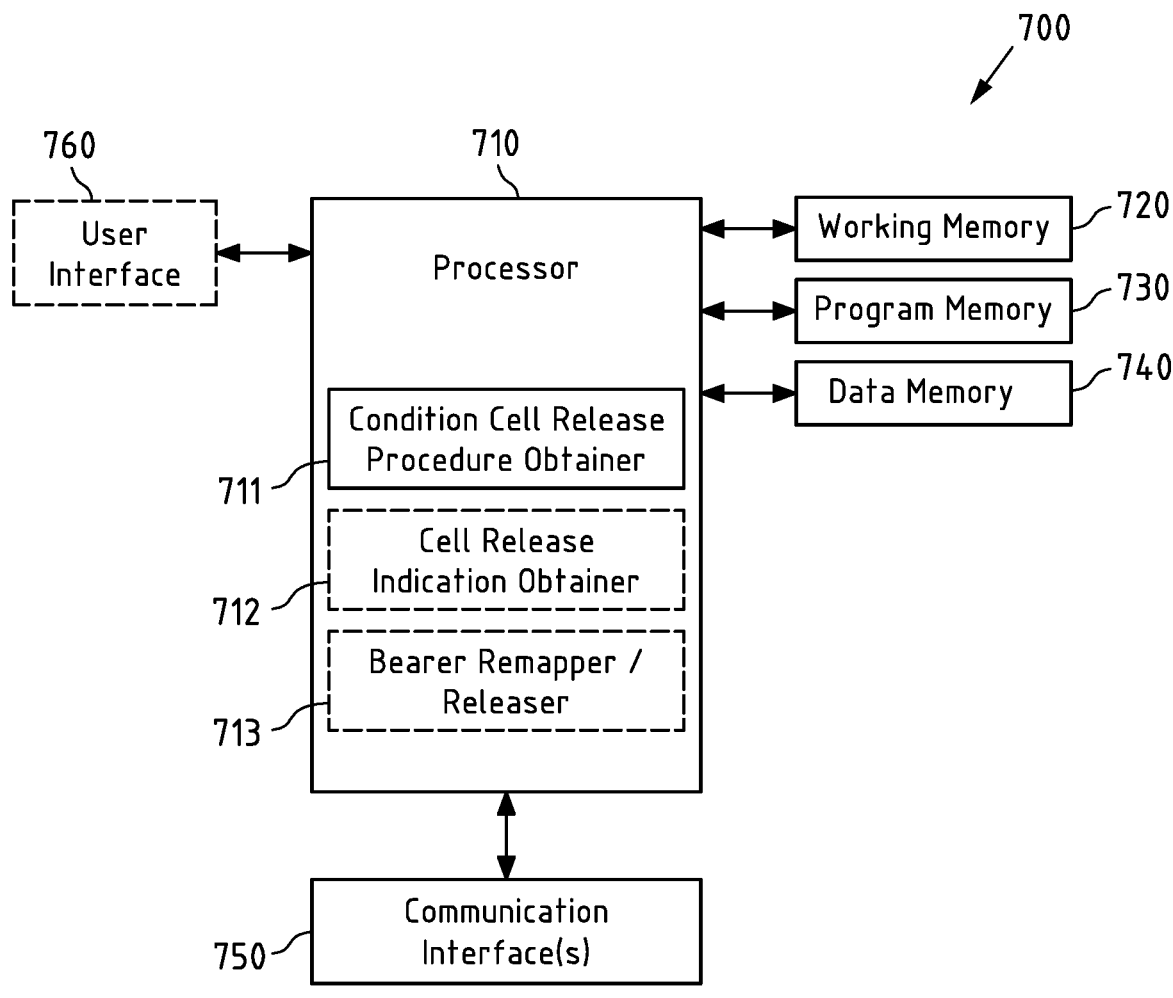
FIG. 7 a schematic block diagram of an apparatus configured to perform the method according to the second exemplary aspect.

FIG. 7 is a schematic block diagram of an apparatus 700 according to an exemplary aspect, which may for instance represent the MN 110 of FIG. 1.

Apparatus 700 comprises a processor 710, working memory 720, program memory 730, data memory 740, communication interface(s) 750, and an optional user interface 760.

Apparatus 700 may for instance be configured to perform and/or control or comprise respective means (at least one of 710 to 760) for performing and/or controlling the method according to the second exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the second exemplary aspect.

Processor 710 may for instance comprise a request for a conditional cell release procedure obtainer 711 as a functional and/or structural unit. Request for a conditional cell release procedure obtainer 711 may for instance be configured to obtain a request for a conditional cell release procedure (see step 301 of FIG. 3).

Processor 710 may for instance comprise an optional indication of an execution of a cell release obtainer 712 as a functional and/or structural unit. Indication of an execution of a cell release obtainer 712 may for instance be configured to obtain an indication of an execution of a cell release (see step 304 of FIG. 3).

Processor 710 may for instance comprise an optional bearer remapper and/or releaser 713 as a functional and/or structural unit. Bearer remapper and/or releaser 713 may for instance be configured to remap and/or release one or more bearers (see step 303 of FIG. 3).

Processor 710 may for instance further control the memories 720 to 740, the communication interface(s) 750, and the optional user interface 760.

Processor 710 may for instance execute computer program code stored in program memory 730, which may for instance represent a computer readable storage medium comprising program code that, when executed by processor 710, causes the processor 710 to perform the method according to the second exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store conditional cell release information, reconfiguration information, bearer remapping information, conditional cell change information, or a combination thereof, to name but a few non-limiting examples.

Communication interface(s) 750 enable apparatus 700 to communicate with other entities, e.g. with mobile device 130 and/or SN 120 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 700 to communicate with other entities, for instance with one or more further radio access nodes of the mobile communication network 150 of FIG. 1.

User interface 760 is optional and may comprise a display for displaying information to a user and/or an input device (e.g. a keyboard, keypad, touchpad, mouse, etc.) for receiving information from a user.

Some or all of the components of the apparatus 700 may for instance be connected via a bus. Some or all of the components of the apparatus 700 may for instance be combined into one or more modules.

The following embodiments shall also be considered to be disclosed:

Embodiment 1

A method performed and/or controlled by at least one apparatus, the method comprising:

determining conditional cell release information indicative of at least one condition based on which a configured cell of a cell group of a mobile communication network is to be released; and releasing the configured cell based, at least in part, on the conditional cell release information.

Embodiment 2

The method according to embodiment 1, further comprising:
    obtaining reconfiguration information indicative of one or more conditions based on which the releasing of the configured cell is to be performed, wherein the conditional cell release information is determined based, at least in part, on the reconfiguration information.

Embodiment 3

The method according to embodiment 1 or embodiment 2, the method further comprising:
    indicating an execution of the release of the configured cell.

Embodiment 4

The method according to embodiment 2 or embodiment 3, wherein the reconfiguration information is further indicative of bearer remapping information enabling a remapping of one or more configured bearers, the method further comprising:
    remapping or releasing of the one or more bearers of the configured cell based, at least in part, on the bearer remapping information.

Embodiment 5

The method according to any of the preceding embodiments, wherein a respective condition is at least one of:
    at least one Ax event of the mobile communication network;
    a lack of data in a transmission buffer; and/or
    a loss of coverage provided by the configured cell.

Embodiment 6

The method according to any of the embodiments 2 to 5, wherein the remapping or releasing of the one or more bearers is performed via a master node of the mobile communication network.

Embodiment 7

The method according to any of the embodiments 2 to 6, wherein the reconfiguration information is obtained when the cell is configured.

Embodiment 8

The method according to any of the preceding embodiments, wherein the configured cell is a PSCell of the mobile communication network.

Embodiment 9

The method according to any of the preceding embodiments, the method further comprising (e.g. prior to determining conditional cell release information):
    determining conditional cell change information indicative of at least one change condition from a configured cell to another cell; and
    changing the configured cell to the other cell based, at least in part, on the conditional cell change information; and postponing the determining of the conditional cell release information until the changing of the configured cell to the other cell is completed.

Embodiment 10

A method performed and/or controlled by at least one apparatus, the method comprising:
    requesting or obtaining a request for a conditional cell release procedure of a configured cell of a cell group of a mobile communication network; and
    obtaining forwarded data upon obtaining of an indication of a releasing of the configured cell.

Embodiment 11

The method according to embodiment 10, wherein the request for a conditional cell release comprises at least one condition based on which the configured cell is released.

Embodiment 12

The method according to embodiment 10 or embodiment 11, further comprising upon obtaining the indication of an execution of the released of the configured cell:
    remapping or releasing one or more bearers based, at least in part, on a bearer remapping information enabling a remapping of one or more configured bearers.

Embodiment 13

The method according to embodiment 12, wherein the remapping or releasing of the one or more bearers is performed via the apparatus.

Embodiment 14

The method according to any of the embodiments 10 to 13, further comprising:
    obtaining an indication of an execution of the cell release of the configured cell.

Embodiment 15

The method according to embodiment 10 or embodiment 11, wherein the obtained request for a conditional cell release procedure comprises an (e.g. implicit) indication for performing the conditional cell release and/or a request for updating one or more bearers.

Embodiment 16

The method according to any of the embodiments 10 to 15, further comprising:
    providing reconfiguration information indicative of one or more conditions enabling a mobile device of the mobile communication network to release the configured cell.

Embodiment 17

The method according to any of the embodiments 10 to 16, wherein a respective condition is at least one of:
    at least one Ax event of the mobile communication network;
    a lack of data in a transmission buffer; and/or
    a loss of coverage provided by the configured cell group.

Embodiment 18

The method according to any of the embodiments 10 to 17, wherein the apparatus is a master node of the mobile communication network.

Embodiment 19

The method according to any of the embodiments 10 to 18, wherein the configured cell is a PSCell of the mobile communication network.

Embodiment 20

An apparatus configured to perform and/or control or comprising respective means for performing and/or controlling the method of any of the embodiments 1 to 8.

Embodiment 21

An apparatus configured to perform and/or control or comprising respective means for performing and/or controlling the method of any of the embodiments 9 to 19.

Embodiment 22

A system, comprising:
at least one first apparatus according to embodiment 20;
at least one second apparatus according to embodiment 21; and
at least one optional SN configured to perform any of the steps of the method according to the second exemplary aspect, or a part of them, at least partially together with the at least one second apparatus.

Embodiment 23

A tangible computer-readable medium storing computer program code, the computer program code when executed by a processor causing an apparatus to perform and/or control:
determining conditional cell release information indicative of at least one condition based on which a configured cell of a cell group of a mobile communication network is to be released; and
releasing the configured cell based, at least in part, on the conditional cell release information.

Embodiment 24

A tangible computer-readable medium storing computer program code, the computer program code when executed by a processor causing an apparatus to perform and/or control:
requesting or obtaining a request for a conditional cell release procedure of a configured cell of a cell group of a mobile communication network; and
obtaining forwarded data upon obtaining of an indication of a releasing of the configured cell.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:
1. An apparatus comprising at least one processor and at least one memory including computer program code, the at least one memory and the computer program code configured to, with the at least one processor, cause the apparatus to at least perform:
determining conditional cell release information indicative of at least one condition based on which a configured cell of a cell group of a mobile communication network is to be released;

releasing the configured cell based, at least in part, on the conditional cell release information by de-configuring a link between the apparatus and the configured cell;

indicating an execution of the release of the configured cell to a master node of the mobile communication network, wherein the least one condition comprises:

at least one Ax measurement event of the mobile communication network;

a lack of data in a transmission buffer; and a loss of coverage provided by the configured cell, wherein indicating an execution of the release of the configured cell comprises sending a respective radio resource control (RRC) signaling message indicating the releasing to a respective master node of the mobile communication network via a reliable communication link, wherein the indication comprises a confirmation message to the mobile communication network that the apparatus has released the configured cell based, at least in part, on the previously obtained reconfiguration information comprising the at least one condition, the confirmation message comprising an Uplink Information Transfer Multi-Radio Dual Connectivity (ULInformationTransferMRDC) message that includes an indication of Conditional Primary Secondary Cell Release (CPR) execution via a binary value to enable the respective master node to obtain the indication of the execution of the release of the configured cell.

2. The apparatus according to claim 1, the at least one memory and the computer program code configured to, with the at least one processor, cause the apparatus further to perform:

obtaining reconfiguration information indicative of one or more conditions based on which the releasing of the configured cell is to be performed, wherein the conditional cell release information is determined based, at least in part, on the reconfiguration information.

3. The apparatus according to claim 1, the at least one memory and the computer program code configured to, with the at least one processor, cause the apparatus further to perform:

indicating an execution of the release of the configured cell.

4. The apparatus according to claim 2, wherein the reconfiguration information is further indicative of bearer remapping information enabling a remapping of one or more configured bearers, wherein the at least one memory and the computer program code configured to, with the at least one processor, cause the apparatus further to perform:

releasing of the one or more bearers of the configured cell based, at least in part, on the bearer remapping information.

5. The apparatus according to claim 1, wherein when it is determined that a respective cell to which the apparatus may change has a better channel quality than a cell to which the mobile device might establish a link in case the configured cell is released, then instead of releasing the cell, changing of the configured cell to another cell of a secondary cell group is performed.

6. The apparatus according to claim 4, wherein releasing of the one or more bearers is performed via a master node of the mobile communication network, wherein for releasing, dedicated signaling is used between the apparatus and the master node via radio resource control (RRC) messages.

7. The apparatus according to claim 2, wherein the reconfiguration information is obtained when the cell is configured.

8. The apparatus according to claim 1, wherein the configured cell is a PSCell of the mobile communication network.

9. The apparatus according to claim 1, the at least one memory and the computer program code configured to, with the at least one processor, cause the apparatus further to perform prior to determining conditional cell release information:

determining conditional cell change information indicative of at least one change condition from a configured cell to another cell; and changing the configured cell to the another cell based, at least in part, on the conditional cell change information; and postponing the determining of the conditional cell release information until the changing of the configured cell to the another cell is completed.

10. A method comprising:

determining conditional cell release information indicative of at least one condition based on which a configured cell of a cell group of a mobile communication network is to be released;

releasing the configured cell based, at least in part, on the conditional cell release information by de-configuring a link between an apparatus and the configured cell; and indicating an execution of the release of the configured cell to a master node of the mobile communication network, wherein the least one condition comprises:

at least one Ax measurement event of the mobile communication network;

a lack of data in a transmission buffer; and a loss of coverage provided by the configured cell, wherein indicating an execution of the release of the configured cell comprises sending a respective radio resource control (RRC) signaling message indicating the releasing to a respective master node of the mobile communication network via a reliable communication link, wherein the indication comprises a confirmation message to the mobile communication network that the apparatus has released the configured cell based, at least in part, on the previously obtained reconfiguration information comprising the at least one condition, the confirmation message comprising an Uplink Information Transfer Multi-Radio Dual Connectivity (ULInformationTransferMRDC) message that includes an indication of Conditional Primary Secondary Cell Release (CPR) execution via a binary value to enable the respective master node to obtain the indication of the execution of the release of the configured cell.

11. The method of claim 10, wherein the at least one Ax measurement event of the mobile communication network is that a serving of the apparatus by a respective cell group becomes worse than a pre-defined threshold, the threshold comprising a minimum quality a respective channel may have.

12. The method of claim 11, wherein the determining of the conditional cell release information comprises checking one or more measurements of one or more Conditional Primary Secondary Cell Change (CPC) target cells at the respective time, the checking comprising determining that any of the one or more CPC target cells is better than a serving by the configured cell of the cell group than a pre-defined or defined according to pre-determined rules threshold, and postponing the releasing of the configured cell.

\* \* \* \* \*